3,244,587
INSECT GROWTH AND REPRODUCTION CONTROL BY 4-IMIDAZOLIN-2 ONE

Edward J. Ayers, Modesto, Calif., assignor to Shell Oil Company, New York, N.Y., a corporation of Delaware
No Drawing. Filed Nov. 17, 1964, Ser. No. 411,790
3 Claims. (Cl. 167—33)

This invention relates to a method for controlling the growth and reproduction processes of insects, and thereby effecting control of those insects.

It has been found that 4-imidazolin-2-one has a profound and unique effect open the development of insects, for when a developing insect is subjected to it, at one point or another the development is arrested, the insect ceases to develop, and dies. From the available evidence, it appears that 4-imidazoline-2-one interferes with growth processes in developing insects which involve differentiation of tissue; it may interfere directly with the tissue differentiation, or it may inhibit hormones which effect and control tissue differentiation, or both. It will be appreciated that the growth processes of insects—those of all animals for that matter—are extremely complex, and have not been completely elucidated, and are not completely understood. It is therefore not possible at this time to say with certainty just what aspect or aspects of the growth process or processes is or are affected by 4-imidazolin-2-one. That it does affect the vital processes of developing insects, and that it does arrest the development of the insects, has been clearly shown, however, by the experimental work performed to date. Thus, it has been founde that when larvae of the common housefly (*Musca domestica*) are fed on media containing an effective amount of 4-imidazolin-2-one the larvae pass into the pupal stage normally, but no adults emerge from the pupae, the insect apparently dying at some time during its life as a pupa. It also has been found that when an effective amount of 4-imidazolin-2-one is present in the food that they eat, the larvae and nymphs of such insects as the large milkweed bug (*Oncopeltus fasciatus*) fail to further develop normally—they fail to pass from one instar to another (they fail to molt) and/or they fail to pupate and/or fail to transform into adult insects. Mosquito (*Anopheles albimanus*) larvae failed to advance from one instar to the next and fourth instar larvae did not pupate, when placed in water containing an effective amount of the compound, and even death of the larvae occurred in some instances. Further, when adult houseflies were fed on a medium containing an effective amount of 4-imidazolin-2-one the females failed to lay eggs, and when adult (and last instar) large milkweed bug nymphs were injected with 4-imidazolin-2-one they failed to reproduce. The apparent difference in the way in which this chemical affects the insects is believed to result only from the different sequences of growth processes involved in the development of the different species of insects. It is believed that in all cases the chemical is affecting the same kinds of growth process (tissue differentiation) and/or are inhibiting the effect of the same hormone, whether the growth process and/or hormone effect is taking place in the development of a viable sperm, a viable egg, in the very early development of the fertilized egg, during or immediately preceding or following a molt, or during metamorphosis.

It has been found, further, that 4-imidazolin-2-one is sufficiently stable and nontoxic that it will pass safely through the gastrointestinal tracts of mammals and birds and its presence in the excreta of the mammals and birds affects the developmental growth processes of insects which feed upon and/or grow in the excreta.

These discoveries provide a method for controlling insects, which method comprises subjecting insects to the action of 4-imidazolin-2-one. In one subgeneric aspect, the method comprises providing in the food and/or water to be consumed by an insect an amount of 4-imidazolin-2-one sufficient to adversely affect developmental growth and reproductive processes of the insect. In another subgeneric aspect, the method comprises providing in the food and/or water to be consumed by adult insects 4-imidazolin-2-one in an amount sufficient to sterilize the adult insects. In another subgeneric aspect, the method comprises providing in the food and/or water to be consumed by a immature insect 4-imidazolin-2-one in an amount sufficient to prevent maturation of said immature insect. In yet another subgeneric aspect, the method comprises providing in the aquatic medium in which an immature insect dwells an amount of 4-imid azolin-2-one sufficient to prevent maturation of said immature insect. In still another subgeneric aspect, the invention comprises the method for controlling insects which employ as growth media—i.e., which feed upon and/or dwell in—the excreta of mammals and birds, which comprises providing in the feed and/or water consumed by the animals a dosage of 4-imidazoline-2-one sufficient to provide in the excreta of the animals an amount of the compound sufficient to adversely affect the growth and reproduction processes of insects which employ the excreta as growth media, especially to prevent maturation of immature insects feeding upon and/or dwelling in the excreta.

4-imidazolin-2-one is a well-known compound. The manner in which it can be prepared is given in the literature (JACS, 68: 2350; JACS 54: 3414).

From the available evidence, 4-imidazolin-2-one affects the vital processes involved in the development of insects, generally. By "insects" is meant not only the members of the class insecta, but also related or similar organisms belonging to allied classes of arthropods and including mites, ticks, spiders, wood lice, and the like.

4-imidazolin-2-one can be employed for controlling the developmental growth proceses of insects by introducing the compound into the food and/or water which the insects consume, and/or into a medium in which the insect is developing. Thus, adult insects can be sterilized by introducing the compound into their food or water before there has occurred in the insects, generation of sperm (in the males) or formation and/or deposition of viable eggs (in the female). The development processes of immature insects can be interrupted by introducing a 4-imidazolin-2-one into their food and/or water, or into their environment or medium in which they are developing—in the case of aquatic insect forms, introducing the compound into their aquatic environment; in the case of insect forms that develop in excreta from mammals, introducing the compound into the excreta. The compound can be introduced directly into the food and/or water to be consumed by the insect, or into the medium in which it is growing, as by spraying, dusting or simply mixing the compound with the food, water and/or medium. In addition, or alternatively, the compound can be introduced into the medium in which the insect forms are developing, such as the excreta from mammals and birds, by including the compound in the food and/or water which the mammals and birds consume.

4-imidazolin-2-one can in many cases be used neat, in the form of powder or dust, which is brought into the insects' food. Thus, the compound can be dusted or sprinkled onto garbage or other refuse, on the droppings of livestock and other animals, on plants attacked by chewing insects, to disseminate the compound on and/or in the insects' food or solid development media; or the compound can be dusted or sprinkled on ponds, streams and other sources of water which insects consume or in which they develop. If desired, the compound can be formulated as dusts or granules, employing conventional solid carriers and extenders, and including adjuvants such as stickers. Alternatively, the compound can be dissolved in water and the resulting solution used instead of the powdered materials. The liquid formulations of the active material can include such adjuvants as the conventional stickers, spreading agents, wetting agents, and the like. If desired, the active material can be disseminated in the form of an aerosol, as by dispersing it by means of a compressed gas.

4-imidazolin-2-one has been found to be essentially nontoxic to mammals and birds at the dosages required to effectively control the developmental growth processes of insects which feed upon and/or develop in excreta from those mammals and birds; furthermore, it is not known to have any adverse effect upon mammals and birds when used at those dosages. In addition to effecting control of insects which feed upon and/or develop in excreta from the mammals and birds this compound also will effect control of parasitic insects present in the gastrointestinal tract of the mammals and birds by affecting the developmental growth processes of those insects. It apparently is platable to mammals and birds, and can readily be introduced into the animals in the feed and/or water consumed by them. By introducing the compound into the animal feed and/or water, it is possible to control both internal parasites of the animal and also insects which feed on and/or develop in the animals' droppings and/or urine, thus providing control of insects such as houseflies and stable flies without the necessity for spraying the excreta.

The concentration of 4-imidazolin-2-one in the insect food, water or growth medium required to interfere with developmental growth processes of the insect, as might be expected varies from species to species of the insects involved. In general, however, a concentration of at least about 5 parts of the compound per million parts (by weight) of the food, water or growth medium is necessary, and usually it will be found desirable to employ somewhat larger concentrations, for example, 50 parts per million or more, on the same basis. However, in some cases where an adult insect does not consume much food and feeds only for short periods of time a much larger dosage of the compound may be required to adversely affect reproduction. In such instances as much as 0.1 percent by weight in the food or water of the compound may be required. In most cases, dosages of from about 10 to about 500 parts per million will be found effective, yet economical.

When the effective dosage of 4-imidazolin-2-one in an animal's feces is to be attained by feeding the compound to the animal, due allowance must be made for the fact that some of the compound inevitably is lost in its passage through the animal. In the case of the monogastric animals—dogs, cats, mice, horses, pigs and the like—the amount of the compound lost during passage through the animal is not great, relatively, and in general the dosage of the compound to be fed the animal will be from about one and one-half to three times the dosage required in the animal excreta. In ruminants, considerably more of the compound can be expected to be lost in passage through the animal—probably because of absorption in the rumen, because of attack by microorganisms in the rumen and because of attack by gastric juices throughout the gastrointestinal tract of the animal. If the compound is used neat, it is generally necessary to provide in the animal feed and/or water a dosage of from about four to about six times the dosage required in the animal excreta. Alternatively, the compound may be fed to the animal in a formula in which it is "protected" from the effects of gastric juice, microorganisms and absorption by the animal. Thus, the compound may be microencapsulated, in the form of "spansules," impregnated in resins, impregnated in controlled solubility starches, clays and the like, or in the form of any of the other "slow release" formulations known to and commonly used in medical and veterinary practice.

The effects of 4-imidazolin-2-one upon insects are demonstrated by the following experiments and their results.

*Example I.—Houseflies*

Twenty-five housefly pupae were placed into a wide-mouth pint jar containing a water drinking dispenser and one gram of a prepared milk formula impregnated with 4-imidazolin-2-one. Several dosages of the test chemical were evaluated in comparison with the untreated control. After the flies emerged from the pupae they fed upon the treated food. Five days after emergence, egg laying-media was provided for the flies. The number of eggs laid was estimated and the development of maggots noted. Table I presents a summary of the data obtained from replicated tests.

TABLE I.—EFFECT OF 4-IMIDAZOLIN-2-ONE ON HOUSEFLY REPRODUCTION

| Concentration in food, percent/w. | Adult mortality, percent | Sterilant effect, percent |
|---|---|---|
| 0.05 | 0 | 95–100 |
| 0.1 | 3 | 95–100 |
| 0.2 | 1 | 95–100 |
| 0.5 | 11 | 95–100 |

In further housefly tests it was found that when 50 p.p.m. of 4-imidazolin-2-one was added to housefly rearing media, that complete inhibition of larval growth was obtained. When 20 p.p.m. was added to the rearing media only one-third of the larvae completed development.

*Example II.—Corn earworm*

When 0.1% 4-imidazolin-2-one was added to a sugar solution and fed to adult corn earworm, *Heliothis zea*, moths, the number of eggs laid by the moths and the number of worms hatching therefrom was greatly reduced when compared to untreated controls fed only sugar water.

*Example III.—Large milkweed bug*

As little as one microgram of 4-imidazolin-2-one injected into fifth instar large milkweed bug nymphs rendered the adults, which developed from the treated individuals, sterile. The compound affected the reproduction of the insect and yet was not toxic to this species at the effective dosage.

*Example IV*

Mosquito (*Anopheles albimanus*) larvae grouped by instar were placed in a series of jars containing various parts per million by weight of 4-imidazolin-2-one in water. At 10 p.p.m. the larvae were unable to complete their development while at 5 p.p.m. only 50% of the larvae completed their development.

*Example V*

Tests were performed to demonstrate whether 4-imidazolin-2-one could be fed to an animal to control insects which breed and/or feed in the excrement of the animal.

Japanese quail were fed 250 parts per million by weight of 4-imidazolin-2-one in their ration for for several days. The droppings of the birds were collected and the droppings from the treated birds were compared to the droppings of untreated birds as a media for housefly development. It was found that the droppings from treated birds produced 96% less fly maggots than the droppings from untreated quail. The 4-imidazolin-2-one showed no apparent toxic effects upon the birds.

I claim as my invention:

1. A method for controlling insects, which method comprises providing 4-imidazolin-2-one in at least one of the food and water to be consumed by an insect, the dosage of said compound being nontoxic to the insect but sufficient to adversely affect the development growth and reproduction processes of the insect and is an amount up to approximately one-tenth of one percent by weight of the food and water.

2. A method according to claim 1 wherein 4-imidazolin-2-one is provided in the aquatic medium in which an immature insect is dwelling.

3. A method according to claim 1 wherein a 4-imidazolin-2-one is provided in at least one of the food and water to be consumed by an animal to control insects which employ as growth media the excreta of the animal.

References Cited by the Examiner

UNITED STATES PATENTS 3,136,774  6/1964  Stoffel _____ 167—33

JULIAN S. LEVITT, *Primary Examiner.*

J. D. GOLDBERG, *Assistant Examiner.*